INVENTOR.
John R. Boyle,
BY Brown, Jackson,
Boettcher & Diemer
attys

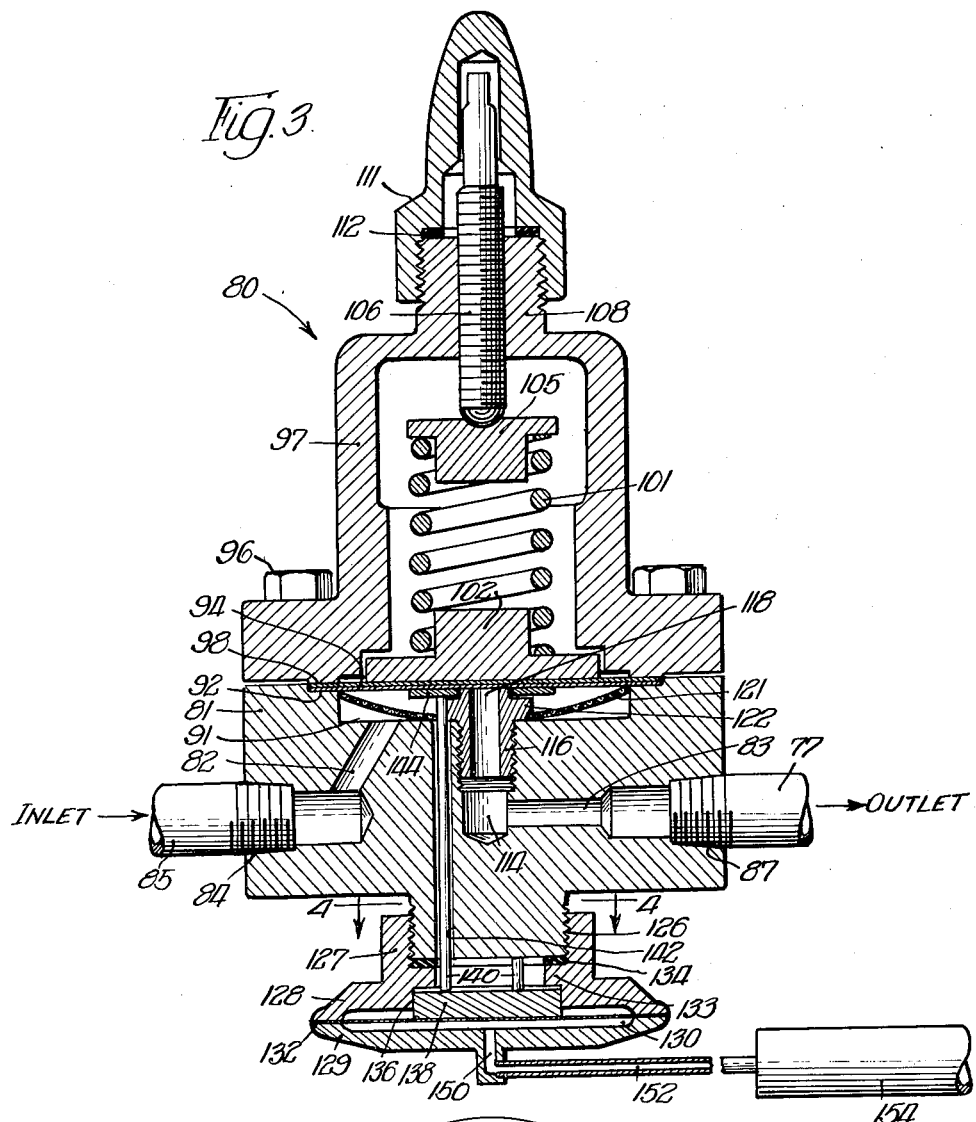
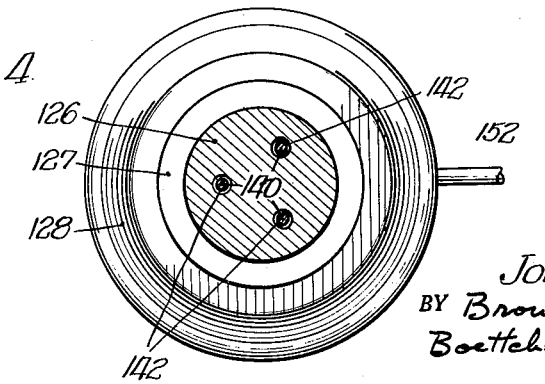

United States Patent Office
2,993,348
Patented July 25, 1961

2,993,348
PRESSURE AND TEMPERATURE RESPONSIVE PILOT VALVE FOR REFRIGERATION SYSTEMS
John R. Boyle, Chicago, Ill., assignor to Hubbell Corporation, Mundelein, Ill., a corporation of Illinois
Filed Aug. 23, 1956, Ser. No. 605,775
2 Claims. (Cl. 62—217)

The present invention relates to a pressure and temperature responsive pilot valve for refrigeration systems. My improved valve has particular application to that type of refrigeration system wherein the regulating or control apparatus of the system comprises a back pressure regulating valve which regulates the flow of refrigerant from the evaporator to the compressor. Heretofore, the majority of these back pressure regulating valves have only been pressure responsive to the pressure existing in the evaporator, or to the pressure differential between the evaporator and the compressor. Heretofore, the majority of these back pressure regulating valves also have customarily been controlled by a pilot valve which is only responsive to the aforesaid evaporator pressure or pressure differential.

The present invention provides a pilot valve which has this well known pressure responsive characteristic, but which also has in addition thereto a temperature responsive characteristic so arranged that the pilot valve also responds to the temperature of the product being cooled, or responds to the temperature of a particular zone or region of the refrigeration system. My improved pilot valve is thus conjointly responsive to this evaporator pressure control and to the temperature control.

One of the objects of the present invention is to provide an improved construction of pressure and temperature responsive pilot valve characterized by an axially aligned relation of first and second diaphragms adapted to act conjointly upon a regulating valve which governs the flow through a valve port, such regulating valve and valve port also being axially aligned concentrically with the concentric first and second diaphragms so that the regulating valve is directly responsive to these first and second diaphragms without the necessity of intervening motion transmitting levers etc. therebetween; and wherein the first diaphragm has one surface area thereof responsive to the pressure transmitted directly from the evaporator before it has passed through the pilot valve, and wherein the second diaphragm has one surface area thereof responsive to the temperature of a particular zone or region of the refrigeration system.

Another object of the invention is to provide an improved construction in which the second diaphragm is housed in a unique separate diaphragm chamber which is readily detachable from the main valve body so as to permit quick and easy substitution of other diaphragm chambers having different second diaphragms of different surface areas mounted therein, whereby to permit ready adjustment of the relationship of the surface areas of the first and second diaphragms.

Other objects, features and advantages of the invention will appear from the following detailed description of one preferred embodiment thereof.

In the accompanying drawings illustrating such embodiment:

FIGURE 3 is a vertical axial sectional view of my improved pressure and temperature responsive pilot valve; and FIGURE 4 is a transverse sectional view taken approximately on the plane of the line 4—4 of FIGURE 3.

Figure 1:
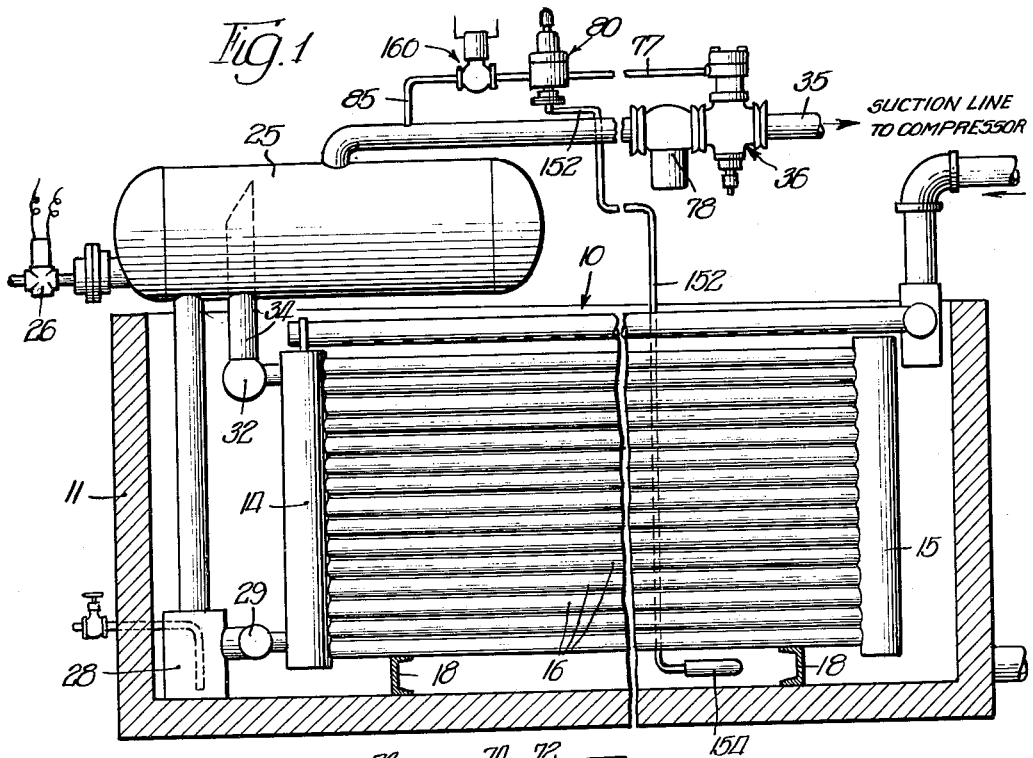
FIGURE 1 is a diagrammatic sectional view illustrating a portion of a back pressure regulated refrigerating system including a Baudelot cooler, this system being chosen solely for the purpose of illustrating one conventional system to which my improved valve is applicable.

Referring first to FIGURE 1, this shows a conventional Baudelot cooler 10 comprising a tank 11 in which are mounted vertical refrigerant headers 14 and 15 joined by substantially horizontal refrigerating tubes 16. There are usually a plurality of these sections 14—16 mounted side-by-side, these sections all being spaced from the bottom of the tank 11 on horizontally extending channels 18. The liquid to be cooled is sprayed or discharged downwardly over these tubes 16 from overhead spray headers 21 which are fed from a transverse supply header 22, the other ends of the spray headers 21 being closed. The liquid intake of the liquid to be cooled occurs through inlet pipe 23, and the liquid outlet of the cooled liquid occurs from the bottom of the tank 11 through discharge pipe 24. It will be assumed for the purposes of illustration that the Baudelot cooler 10 is employed for cooling milk in a dairy or the like, but it is to be understood that this Baudelot cooler is chosen merely as being typical of one conventional refrigeration system, and that the invention is applicable to any other type of refrigeration system in which back pressure regulation is employed. The Baudelot cooler 10 constitutes the evaporating unit of the refrigerating system.

Other conventional elements of the illustrative refrigeration system include an accumulator 25 to which the liquid refrigerant is fed through a solenoid controlled electric valve 26. From the lower part of the accumulator 25 the refrigerant is fed to an oil separator 28 and thence to a horizontal supply header 29 which has connection with each of the vertical headers 14. The oil separator 28 has a conventional oil drain. Connected to receive the gaseous refrigerant from the upper ends of each of the vertical headers 14 is a horizontal header 32 which is connected through pipe 34 opening into the upper area of the accumulator 25. Leading from the top of the accumulator is the suction line 35 which extends to the inlet side of the compressor, not shown.

Figure 2:
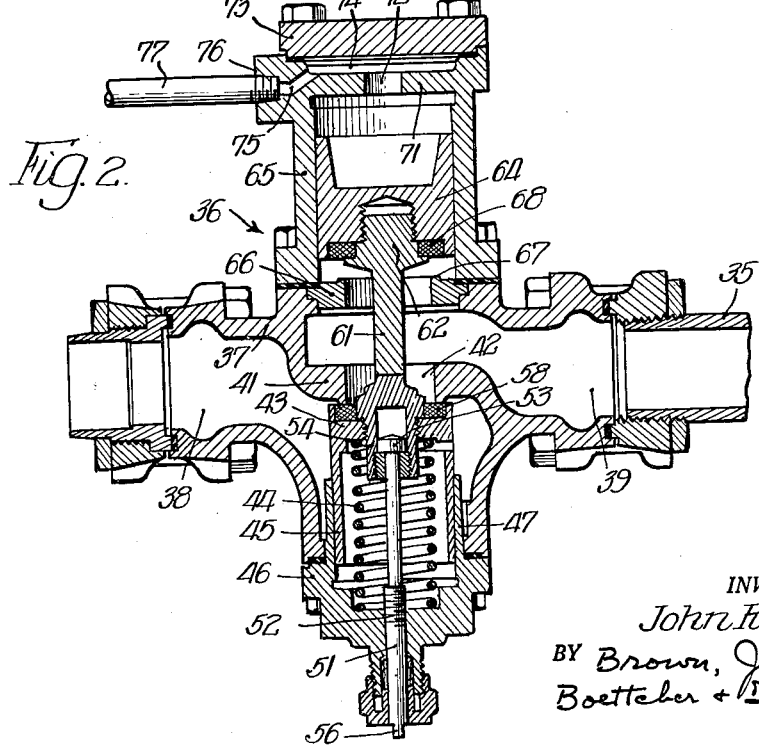
FIGURE 2 is a vertical axial sectional view of a conventional back pressure regulating valve used in the above system, and to which my improved pressure and temperature responsive pilot valve is applied or connected.

Interposed in the suction line 35 is the back pressure regulating valve 36 which regulates the back pressure between the evaporator 10 and the compressor. This back pressure regulating valve 36 may be of any preferred construction, one typical embodiment being shown in FIGURE 2. Such embodiment comprises a main valve body or casing 37 having an inlet passage 38 and an outlet passage 39 with a partition 41 between said passages. Connection between the inlet passage 38 and the outlet passage 39 is afforded by a port 42 in the partition 41, which port is adapted to be closed by a valve 43 that is yieldingly seated by a spring 44 extending upwardly in the hollow cylindrical body 45 of the valve 43. The spring 44 reacts between the head of the cylindrical guide body 45 of the valve and a lower cap 46 which is secured to the main valve body 37 and which provides a cylindrical tubular guide 47 for the cylindrical body 45 of the valve. Occasionally it is desirable to open the back pressure valve manually, and for this purpose there is provided a headed stem 51 threaded into the lower cap 46 at 52 and having its head 53 swivelly engaged with the lower end of a plug 54 which is rigidly secured in the body of the main valve 43. The lower end 56 of the stem 51 is squared or flattened so that it may be engaged or turned by a suitable key or wrench, whereupon its threaded bearing 52 in the cap 46 will cause it to be moved longitudinally for withdrawing the valve 43 from its seat against the port 42. By this adjustment, the valve may be held open as long as desired, and then released to its normal closed position. The plug 54 has screwed mounting in valve body 43, and has a flanged upper portion which seats upon and holds in place a renewable valve seat ring 58, which is adapted to engage with the lower flange of the valve port 42. The upper end of the plug 54 is engaged by the lower end of a valve actuating stem 61 which is formed at its upper end with a threaded plug 62 which screws into an upper actuating piston 64. The piston 64 reciprocates in a cylindrical casing 65 which is secured to the valve body 37 in alignment with the main valve port 42. Mounted between the cylindrical housing 65 and the main valve body 37 is a ring 66 formed with an upper seat bead 67 against which is adapted to engage a seat disc or ring 68 carried in the underside of the piston 64. Extending across the top of the cylindrical casing 65 is a head flange 71 which has a central aperture 72 therein. Bolted to the top of the cylinder casing 65 is a cap 73 which encloses an upper space 74 communicating with the central aperture 72. Opening into this upper space 74 is a passage 75 leading to an internally threaded boss 76 into which screws the pipe or tube 77 extending from the pressure and temperature responsive pilot valve, designated 80. It is conventional practice to interpose in the suction line 35 on the intake side of the back pressure regulating valve 36 a strainer 78 embodying a strainer screen, such device being old and well known.

Referring now to the pressure and temperature responsive pilot valve 80 of my invention, it will be seen from FIGURE 3 that this valve comprises a main valve body or housing 81 having an inlet passage 82 entering one side and an outlet passage 83 leaving at the other side. A threaded bore 84 connects the inlet passage 82 with an inlet pipe or tube 85 which connects with the suction line 35 at a point anterior to the back pressure regulating valve 36. The outlet passage 83 is provided with an internally threaded counterbore 87 into which screws the outlet pipe or tube 77 which connects with the power cylinder and piston of the back pressure regulating valve 36.

Formed in the top side of the valve body 81 is a circular diaphragm chamber 91 which is surrounded by a depressed clamping lip or shoulder 92. Spanning the diaphragm chamber 91 and clamped to the lip or shoulder 92 is a diaphragm structure 94. This diaphragm structure may consist of a single flexible diaphragm, or it may consist of two flexible diaphragm membranes mounted in abutment. Secured by cap screws 96 to the top side of the valve body 81 is a spring enclosing bonnet or housing 97. The bottom face of this bonnet or housing cap 97 is formed with a downwardly projecting circular rib 98 which cooperates with the clamping lip or shoulder 92 for clamping the diaphragm structure therebetween.

Enclosed within the bonnet or cap 97 is an adjustable compression spring 101 which has its lower end thrusting against a pressure plate 102 that bears against the top of the diaphragm 94. The upper end of the compression spring 101 bears against the thimble 105 which can be adjusted upwardly or downwardly through a threaded adjusting stem 106. This adjusting stem screws through an internally threaded bore in a boss 108 projecting upwardly from the housing cap 97. Screwing down over an external thread on the boss 108 is a removable closure cap 111 which compresses a sealing ring 112 against the top of the boss 108. Removal of the cap 111 affords access to the upper end of the adjusting stem 106 through which the downward pressure of the compression spring 101 can be adjusted.

Extending axially downwardly from the diaphragm chamber 91 is a vertical bore 114 which communicates at its lower end with the horizontal outlet passage 83. Screwing into the threaded upper portion of the vertical axial bore 114 is a tubular pilot port bushing 116. A pilot seat bead surrounding the pilot port opening 118 at the upper end of the bushing is adapted to have seating engagement with the underside of the diaphragm 94. Extending transversely across the lower part of the diaphragm chamber 91 is a screen 121 which has its circular outer edge resiliently pressed into the diaphragm chamber. The apertured center of this screen 121 is held down against the bottom of the diaphragm chamber 91 by an outwardly projecting annular flange 122 on the pilot seat bushing 116.

The parts thus far described constitute the conventional pressure responsive pilot valve for controlling a back pressure regulating valve, such as indicated at 36. Considering now the pressure response of this improved pilot valve, separate and apart from its temperature response to be later described, it will be apparent that when the pressure in the evaporator 10 rises above the predetermined suction line back pressure, which has been established by the compression setting given the spring 101, the diaphragm 94 rises and opens the pilot port 118, thereby admitting evaporator pressure through tube 77 to the upper side of the power actuated piston 64 for opening or increasing the opening of the back pressure regulating valve 36. When the evaporator pressure falls below the predetermined minimum, the diaphragm 94 moves downwardly and closes or reduces the pilot outlet port 118 for causing the reverse operation of the back pressure regulating valve 36.

Referring now to the thermally responsive control phase of my improved pilot valve 80, it will be seen that an externally threaded boss 126 extends downwardly from the bottom of the valve body 81. Screwing over this boss is the internally threaded hub 127 of a diaphragm housing member 128. Secured to this diaphragm housing member is a lower diaphragm housing member 129, these two housing members defining therebetween a diaphragm chamber 130, across which extends a diaphragm 132. This latter diaphragm preferably has a larger effective area than the upper diaphragm 94, but, as will be later described, this relationship of the effective surface areas between the two diaphragms can be readily adjusted to meet different operating conditions. The upper diaphragm housing member 128 is formed with an inwardly projecting flange 133 which compresses a gasket 134 against the lower end of the threaded boss 126. Formed in the upper housing member 128, below the flange 133, is a cylindrical cavity 136 in which a pressure ring or piston 138 is slidably mounted. This ring or piston rests on the top side of the diaphragm 132 and transmits upward thrust from the diaphragm to the lower ends of a plurality of vertical push rods 140. These push rods, of which there are preferably three, extend upwardly through bores 142 in the valve body 81 and have their upper ends arranged to bear against a thrust ring 144. This thrust ring 144 has a large central opening which loosely surrounds the upper end of the pilot port bushing 116, being confined against the under side of the pressure responsive diaphragm 94 by the pilot port bushing. Thus, upward flexure of lower diaphragm 132 is transmitted through push rods 140 to the upper diaphragm 94 for opening the pilot outlet port 118. The push rod holes 142 bleed evaporator pressure from the upper diaphragm chamber 91 down to the upper side of the lower pressure responsive diaphragm 132.

The lower portion of the diaphragm chamber 130 below the diaphragm 132 is connected through passage 150 with a long flexible tube 152 leading to a temperature responsive bulb 154. The connecting tube 152 may have a capillary bore, and the bulb 154 preferably comprises a small closed metallic cylinder. This bulb 154, connecting tube 152, and diaphragm chamber 130 are charged about half full with a suitable thermally responsive fluid, or liquid such as ammonia, or other fluid having the desired evaporative characteristics. The bulb 154 is located at any desired point in the refrigeration system, for responding to the temperature of the product being cooled, or for responding to the temperature of a particular zone or region of the refrigeration system. In FIGURE 1, I have illustrated the bulb as being located on or adjacent to the bottom of the tank 11 for responding to the temperature of the milk after it has been cooled by passing down over the Baudelot cooler 10.

In my improved pressure and temperature responsive pilot valve, the evaporator pressure and the thermal bulb pressure work together in a manner to create a sensitive control. With regard to the rate of modulation, the speed at which the diaphragms move is controlled by their diameters. For example, if the temperature responsive diaphragm 132 is made slightly larger than the pressure responsive diaphragm 94, the valve response will be more rapid on a temperature change and slower on a pressure change. This change in the relative surface areas between the two diaphragms is readily accommodated by the previously described construction of the lower diaphragm housing 128 having the internally threaded hub 127 screwing over the downwardly extending externally threaded boss 126, which enables this lower diaphragm housing to be readily unscrewed from the main valve body and substituted by other sizes of lower diaphragm housings having different effective areas of lower diaphragms 132. In preferred practice, the valve area is such that the pressure responsive diaphragm 94 has only to move approximately .0002 inch to obtain full flow through the valve.

One of the distinctive features of my improved pilot valve is a controlled low limit capacity. That is to say, when the desired temperature is reached, the thermal bulb pressure emanating from the bulb 154 is sufficiently low to relieve all pressure on the push rods 140, the latter therefore becoming temporarily inoperative. At this point, the evaporator pressure takes over control through the upper pressure responsive diaphragm 94, maintaining a constant evaporator pressure which is only sufficient to overcome the low capacity heat leakage.

Another distinctive feature of my improved pilot valve is that of anticipated load changes. That is to say, the combination use of evaporator pressure and thermal control results in rapid readjustment. For example, let us assume a substantially instantaneous load increase, such as milk beginning to flow over a Baudelot cooler. The evaporator pressure will rapidly increase due to the boiling action caused by the hot milk. This pressure increase is almost instantaneous, whereas the thermal bulb 154 located at the bottom of the Baudelot cooler has not as yet received the milk cascading over the cooler. Before the thermal bulb 154 will react, the milk must contact the bulb and overcome the thermal inertia of the mass of metal and of the ammonia within the bulb. Using only thermal control, the first milk is always too hot, but by the use of the pressure actuated portion of the valve the evaporator pressure has become adjusted to the load. After the milk has equalized the thermal control bulb temperature the valve then becomes controlled from temperature.

Another feature of my improved pilot valve is its ability to compensate for variable suction pressure. Often, while operating under constant load on the thermally controlled evaporator, some other plant equipment may cause a change in the suction pressure. The pressure effects the controlled evaporator pressure. This evaporator pressure change is immediately corrected by the upper diaphragm 94 sensing the pressure change. Hence it will be seen that when the suction pressure varies, the pilot valve will compensate for changes before the thermal mass under control changes sufficiently to activate the thermal control.

Another feature of my improved pilot valve is the limited evaporator pressure range. The thermal control element is preferably quite sensitive and runs to its limits within ½° F. change in temperature, whereupon the upper or pressure responsive diaphragm 94 then takes over, which prevents the evaporator pressure from becoming entirely out of control.

While I have illustrated my improved pilot valve as controlling a particular type or construction of back pressure regulating valve, indicated at 36, I wish it to be understood that my pilot valve can be employed for controlling any design of back pressure regulator or combination regulator and stop valve. In fact, in smaller size refrigeration installations, my improved valve may be employed as the primary back pressure regulating valve instead of a pilot valve for controlling a large size back pressure regulating valve.

In the event that the thermally responsive bulb 154 and tube 152 become damaged or lose their charge, the pilot valve can be operated solely under suction pressure control by readjusting the compression spring 101 for the required evaporator pressure.

In the installation of the apparatus, the setting for temperature is preferably the primary setting given to the apparatus.

Other auxiliary equipment may also be associated with my improved pilot valve 80. For example, in FIGURE 1, I have shown an electrically responsive solenoid valve 160 interposed in the control line 85 leading from suction line 35. When such a solenoid valve is used it is preferably connected in parallel across the leads to the pump motor so that it will be energized simultaneously with the energization of the pump motor. Similarly the liquid feed solenoid valve 26 is likewise connected across the leads to the pump motor so that it is energized simultaneously with the energization of the pump motor.

While I have illustrated and described what I regard to be the preferred embodiment of my invention, nevertheless it will be understood that such is merely exemplary and that numerous modifications and rearrangements may be made therein without departing from the essence of the invention.

I claim:

1. In a refrigeration system comprising an evaporator connected to the inlet side of a compressor and having a main back pressure regulating valve interposed in said connection, the combination therewith of a pressure and temperature responsive pilot valve for effecting a closely modulated control of said main back pressure regulating valve, said pilot valve comprising an upper diaphragm chamber, an upper diaphragm in said upper diaphragm chamber, a lower diaphragm chamber, a lower diaphragm in said lower chamber, said two chambers and said two diaphragms being disposed in coaxial alignment, an inlet passage in said upper diaphragm chamber connected to have the evaporator pressure maintained substantially constantly therein, means establishing continuous open communication between said inlet passage and the under surface of the upper diaphragm in the upper diaphragm chamber, means establishing continuous open communication between said inlet passage and the upper surface of the lower diaphragm in the lower diaphragm chamber, whereby the under and upper opposing surfaces of the upper and lower diaphragms both have the full evaporator pressure constantly imposed thereon, spring means above said upper diaphragm normally tending to flex said upper diaphragm downwardly, push rods for transmitting upward flexure of said lower diaphragm to said upper diaphragm, a thermal bulb placed to respond to the temperature of a particular region of said refrigerating system, a tube leading from said bulb into said lower diaphragm chamber on the under side of said lower diaphragm, whereby to exert upward pressure on said lower diaphragm upon a predetermined temeprature rise in the region of said bulb, a valve port having discharge communication with said upper diaphragm chamber, a cooperating regulating valve mounted centrally on the under side of said upper diaphragm to move in a port-opening direction by upward flexure of said upper diaphragm, and means for detachably securing said lower diaphragm chamber to said upper diaphragm chamber, whereby said lower diaphragm chamber can be substituted by other lower diaphragm chambers having lower diaphragms of different effective diameters.

2. In a refrigeration system of the class described comprising an evaporator connected to the inlet side of a compressor and having a large capacity back pressure regulating valve interposed in said connection, the combination therewith of a pressure and temperature responsive pilot valve for effecting a closely modulated control of said back pressure regulating valve, said pilot valve comprising the combination of an upper valve body, an upper diaphragm chamber in said upper valve body, an upper diaphragm in said upper diaphragm chamber, a lower valve body, a lower diaphragm chamber in said lower valve body, a lower diaphragm in said lower diaphragm chamber, said two diaphragms being disposed in coaxial alignment, an inlet passage in said upper valve body adapted to have the evaporator pressure maintained substantially constantly therein, means establishing a continuous open communication between said inlet passage and the under surface of the upper diaphragm in the upper diaphragm chamber, means establishing continuous open communication between said inlet passage and the upper surface of the lower diaphragm in the lower diaphragm chamber, whereby the under and upper opposing surfaces of the upper and lower diaphragms both have the full evaporator pressure constantly imposed thereon, push rods grouped symmetrically around the coaxial line of said upper and lower diaphragms for transmitting upward flexure of said lower diaphragm to said upper diaphragm, said push rods being of a length shorter than the distance between said two diaphragms when the latter are in unflexed conditions, and said push rods having their ends readily separable from one of said diaphragms, whereby pressure responsive upward movement of said upper diaphragm can occur without being impeded by said lower diaphragm, a thermal bulb placed to respond to the temperature of a particular region of said refrigerating system, a tube leading from said bulb into said lower diaphragm chamber on the under side of said lower diaphragm, whereby to exert upward pressure on said lower diaphragm upon a predetermined temperature rise in the region of said bulb, a control port opening downwardly in said upper diaphragm chamber, an outlet passage in said upper valve body for conducting refrigerant from said control port of the pilot valve to said back pressure regulating valve for exercising a control function on the latter, a valve element mounted centrally on the under side of said upper diaphragm for moving directly therewith in a port-opening direction by upward flexure of said upper diaphragm, a single helical compression spring disposed above said upper diaphragm coaxially of both diaphragms, said single compression spring acting downwardly on said upper diaphragm for normally tending to move said valve element into port-closing position, and also acting downwardly through said push rods for normally tending to hold said lower diaphragm flexed downwardly, means for adjusting the pressure of said compression spring, and means for detachably securing said lower valve body to said upper valve body comprising a threaded boss extending downwardly from said upper valve body, and a threaded hub extending upwardly from said lower valve body and adapted to screw over said threaded boss, whereby said lower diaphragm chamber can be substituted by other lower diaphragm chambers having lower diaphragms of different effective diameters.

References Cited in the file of this patent

UNITED STATES PATENTS

| | | |
|---|---|---|
| 2,046,894 | Candor | July 7, 1936 |
| 2,053,365 | Evers | Sept. 8, 1936 |
| 2,097,539 | Tomlinson | Nov. 2, 1937 |
| 2,401,144 | Dube | May 28, 1946 |
| 2,504,689 | Hopp | Apr. 18, 1950 |
| 2,505,933 | Aughey et al. | May 2, 1950 |
| 2,733,865 | Ehlke | Feb. 7, 1956 |
| 2,759,674 | Jorgensen | Aug. 21, 1956 |